US007545753B2

(12) United States Patent  
Stirbu

(10) Patent No.: US 7,545,753 B2
(45) Date of Patent: Jun. 9, 2009

(54) SYSTEM, METHOD AND COMPUTER PROGRAM PRODUCT FOR PROVIDING QUALITY OF SERVICE DURING REMOTE ACCESS TO A PLUG-AND-PLAY NETWORK

(75) Inventor: Vlad Stirbu, Tampere (FI)

(73) Assignee: Nokia Corporation, Espoo (FI)

( * ) Notice: Subject to any disclaimer, the term of this patent is extended or adjusted under 35 U.S.C. 154(b) by 480 days.

(21) Appl. No.: 11/380,764

(22) Filed: Apr. 28, 2006

(65) Prior Publication Data
US 2007/0253427 A1 Nov. 1, 2007

(51) Int. Cl.
*H04L 12/26* (2006.01)
*H04L 12/56* (2006.01)
(52) U.S. Cl. ........................ 370/252; 370/401
(58) Field of Classification Search ......... 370/252–255, 370/389, 392, 392.21, 400, 401
See application file for complete search history.

(56) References Cited

U.S. PATENT DOCUMENTS

| 7,180,855 | B1 * | 2/2007 | Lin ............................. 370/230 |
| 2005/0041670 | A1 * | 2/2005 | Lin et al. ................ 370/395.21 |
| 2006/0104370 | A1 * | 5/2006 | Yamanaka et al. ........... 375/242 |
| 2007/0286074 | A1 * | 12/2007 | Xu ............................. 370/230 |
| 2008/0080380 | A1 * | 4/2008 | Lee et al. ..................... 370/235 |
| 2008/0080534 | A1 * | 4/2008 | Lee et al. ..................... 370/401 |
| 2008/0140842 | A1 * | 6/2008 | Kwang-Il et al. ............ 709/226 |

FOREIGN PATENT DOCUMENTS

WO WO 2005/076567 A1 8/2005

OTHER PUBLICATIONS

Daryl Hlasny et al.; *UPnP QoS Architecture: 1.0*; Mar. 2005; 28 pages; Version 1.0; Contributing Members of the UPnP Forum.

* cited by examiner

*Primary Examiner*—Hong Cho
(74) *Attorney, Agent, or Firm*—Alston & Bird LLP

(57) ABSTRACT

A network entity for providing QoS during remote access to a PnP network includes a QoS manager for receiving in-band device capabilities of a PnP-enabled in-band correspondent and a PnP-enabled out-of-band remote node, the remote node being in communication with the PnP network over a secure tunnel. As presented, the in-band device capabilities of the correspondent node are at least partially based on an in-band network interface of the correspondent node. The in-band device capabilities of the remote node, however, comprise capabilities having been mapped from out-of-band device capabilities, where those out-of-band device capabilities are at least partially based on an out-of-band network interface of the remote node. The QoS manager is further adapted to configure the correspondent and remote nodes for a desired in-band QoS based on the QoS policy and respective device capabilities.

30 Claims, 5 Drawing Sheets

SYSTEM, METHOD AND COMPUTER PROGRAM PRODUCT FOR PROVIDING QUALITY OF SERVICE DURING REMOTE ACCESS TO A PLUG-AND-PLAY NETWORK

FIELD OF THE INVENTION

The present invention generally relates to systems and methods of accessing a plug-and-play network and, more particularly, relates to systems and methods of providing quality of service (QoS) during remote access to a plug-and-play network.

BACKGROUND OF THE INVENTION

Architectures such as that provided by Universal Plug and Play (UPnP™) define architectures for the network connectivity of intelligent appliances, wireless devices, and PCs of all form factors. The goal of UPnP™ technology is to provide easy-to-use, flexible, standards-based connectivity for ad-hoc or unmanaged networks whether in a home, in a small business, or in public spaces. In support of this goal, UPnP™ supports zero-configuration, "invisible" networking, and the automatic discovery of devices from a wide range of manufacturers. As a result, a device can dynamically join a network, obtain an IP address, convey its capabilities to the network, and determine the presence and capabilities of other devices.

UPnP™ is more particularly an open networking architecture that consists of services, devices, and control points. Control points are essentially software applications and are the active components of the UPnP™ architecture. Devices are physical or logical entities, enumerated via simple extensible Markup Language (XML) descriptions and containing Application Programming Interfaces (APIs) referred to as services. Physical devices may host multiple logical devices, and each device may host multiple services. Services are groups of states and actions. For example, a light switch has an "on" state and an "off" state. An action allows the network to determine the state of the switch or to change the state of the switch. Services typically reside in devices.

One of the primary concerns with emerging connectivity architectures is that of quality of service (QoS). Currently, UPnP™ defines a framework intended to improve the user experience of a network's ability to deliver predictable results for sensitive applications such as audio, video, and voice applications. For more information on such a framework, see UPnP Forum, *UPnP QoS Architecture* 1.0 (Mar. 10, 2005), the content of which is incorporated herein in its entirety.

Although UPnP™ currently defines a framework for ensuring a desired level of QoS, the QoS framework generally fails for remote nodes accessing a UPnP™ network. Conventionally, remote nodes accessing a UPnP™ network typically do so via a Virtual Private Network (VPN) or other secure tunnel (e.g., IPSec, SSL/TLS, etc.) in such a manner that the remote nodes appear to correspondent nodes within the UPnP™ network as though they are part of the UPnP™ network. A fundamental assumption for UPnP™ QoS is that every device in the UPnP™ network is in the same IP subnet, and as such, routing between devices in UPnP™ is out of scope for UPnP™ QoS. That is, although the remote device is part of the same IP subnet as the UPnP™ network, the segment between the remote device and an Internet Gateway Device (IGD) (providing access to the UPnP™ network) is inside a VPN tunnel. Thus, conventional UPnP™ QoS may fail to work via a VPN or other secure tunnel as the QoS signaling is buried in the VPN or other secure tunnel and not visible to the network elements necessary to establish that QoS.

SUMMARY OF THE INVENTION

In light of the foregoing background, exemplary embodiments of the present invention provide improved network entities, methods and computer program products for providing quality of service (QoS) during remote access to a plug-and-play (PnP) network. Exemplary embodiments of the present invention provide an architecture for exposing an out-of-band PnP-enabled remote node to an in-band PnP QoS service of a PnP network, the remote node being in communication with the PnP network over a secure tunnel. More particularly, the remote node of exemplary embodiments of the present invention may be adapted to map out-of-band device capabilities to in-band device capabilities, such that those in-band device capabilities may be exposed to an in-band PnP QoS service. The remote node may then be configured for in-band PnP QoS service based on those mapped device capabilities. During effectuation of the PnP QoS service, the remote device may operate in accordance with the in-band QoS service, even though the remote device may implement an out-of-band QoS service over the secure tunnel between the remote node and the PnP network.

According to one aspect of the present invention, a network entity (e.g., Internet gateway device) is presented for providing QoS during remote access to a PnP network. The network entity includes a QoS manager for retrieving a QoS policy for a traffic stream in accordance with a PnP QoS. The QoS manager is also adapted to receive in-band device capabilities of PnP-enabled correspondent and remote nodes, such as in accordance with the PnP QoS. In this regard, the correspondent node is located in-band with respect to a PnP network, and the PnP-enabled remote node located out-of-band with respect to the PnP network and in communication with the PnP network over a secure tunnel. As presented, the in-band device capabilities of the correspondent node are at least partially based on an in-band network interface of the correspondent node. The in-band device capabilities of the remote node, however, comprise capabilities having been mapped from out-of-band device capabilities, where those out-of-band device capabilities are at least partially based on an out-of-band network interface of the remote node.

The QoS manager is further adapted to configure the correspondent and remote nodes for a desired in-band QoS based on the QoS policy and respective device capabilities. In this regard, the correspondent and remote nodes may be configured such that they are thereafter adapted to pass a traffic stream therebetween in accordance with the desired in-band QoS. As the remote node is in communication with the PnP network over a secure tunnel, the traffic stream may be passed at least partially over the secure tunnel. In such instances, however, the remote node may implement an out-of-band QoS over the secure tunnel based on the in-band QoS.

If so desired, the QoS manager may be further adapted to monitor a state of the traffic stream being passed between the remote and correspondent nodes. In such instances, the state of the traffic stream may be monitored based on in-band traffic-related information determined by the remote and correspondent nodes. Similar to the device capabilities, the in-band traffic-related information determined by the remote node may have been mapped from out-of-band traffic-related information, which has been at least partially reported by the out-of-band network interface of the remote node.

According to another aspect of exemplary embodiments of the present invention, a network entity (e.g., remote node) for providing QoS during remote access to a PnP network includes a plurality of components located out-of-band with respect to the PnP network. In this regard, the PnP-enabled network may include a PnP-enabled correspondent node located in-band with respect to a PnP network. As presented, the plurality of components may include an out-of-band network interface for initiating communication with the PnP network over a secure tunnel, and an out-of-band virtual interface for mapping out-of-band device capabilities into in-band device capabilities, where the out-of-band device capabilities are at least partially based on the out-of-band network interface. In addition, the network entity may include a PnP device for sending the in-band device capabilities to a QoS manager of the PnP network, such as that explained above. The out-of-band network interface may then be adapted to pass a traffic stream to the correspondent node in accordance with the desired in-band QoS, the traffic stream being passed at least partially over the secure tunnel.

According to other aspects of the present invention, methods and computer program products are presented for providing QoS during remote access to a PnP network. As indicated above and explained below, network entities, methods and computer program products of exemplary embodiments of the present invention may solve the problems identified by prior techniques and may provide additional benefits.

BRIEF DESCRIPTION OF THE DRAWINGS

Figure 1:
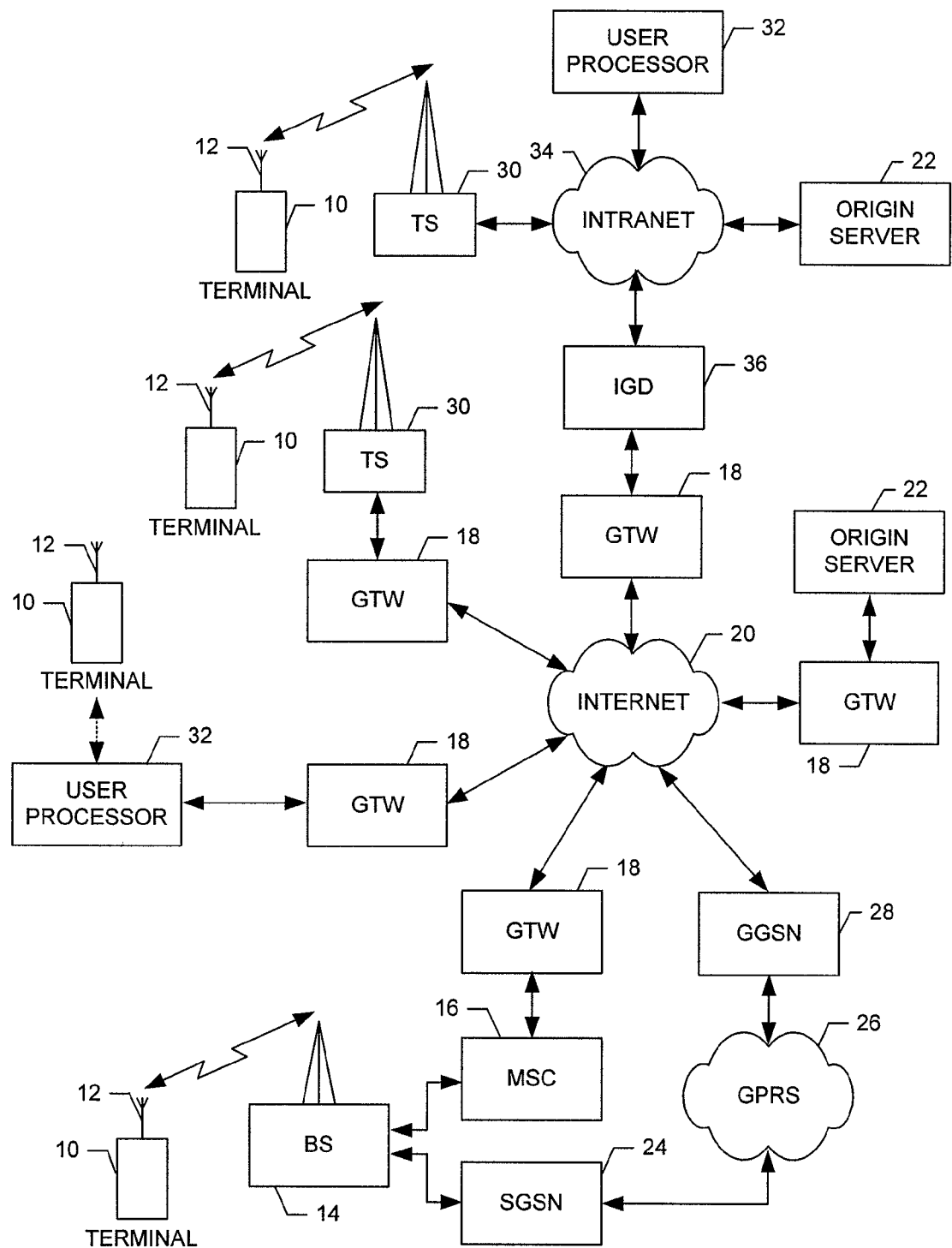
Figure 2:
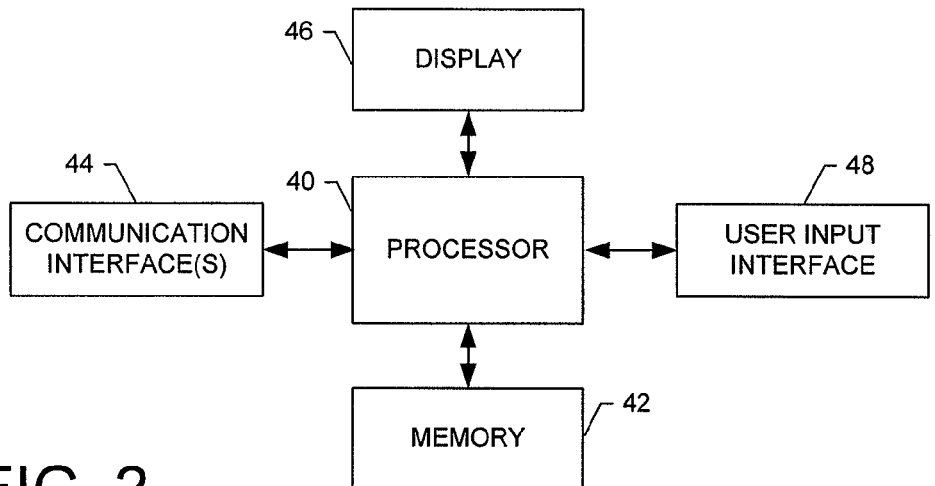
Figure 3:
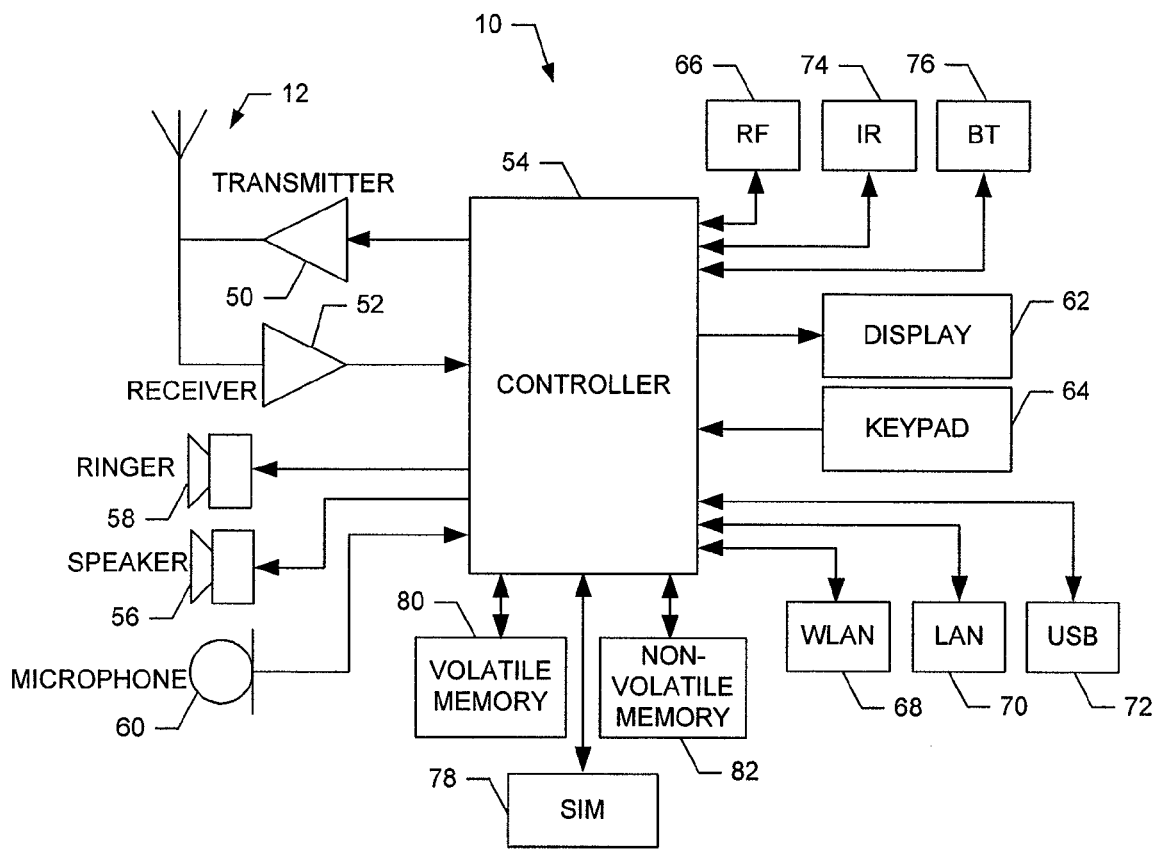
Figure 4:
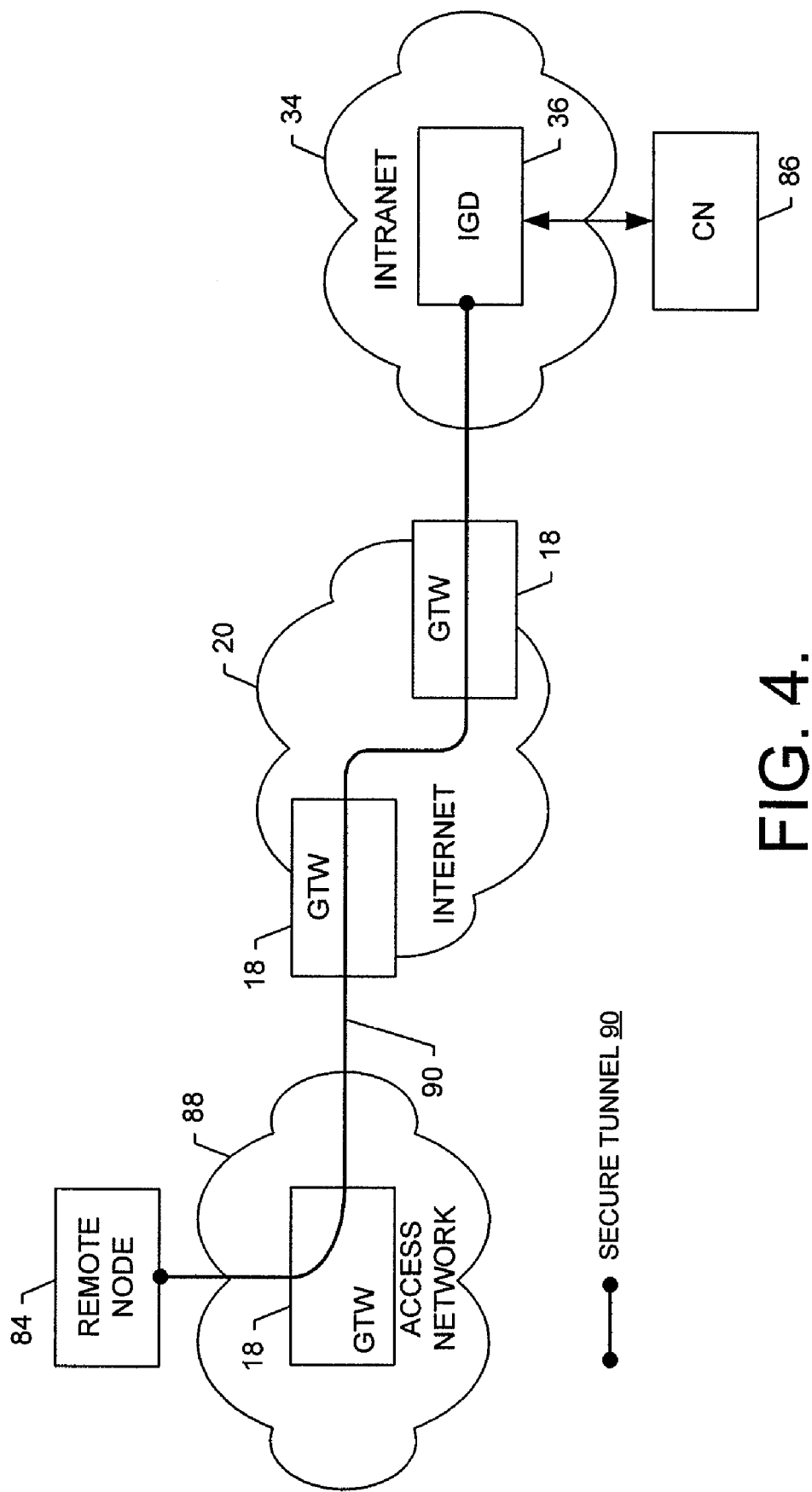
Figure 5:
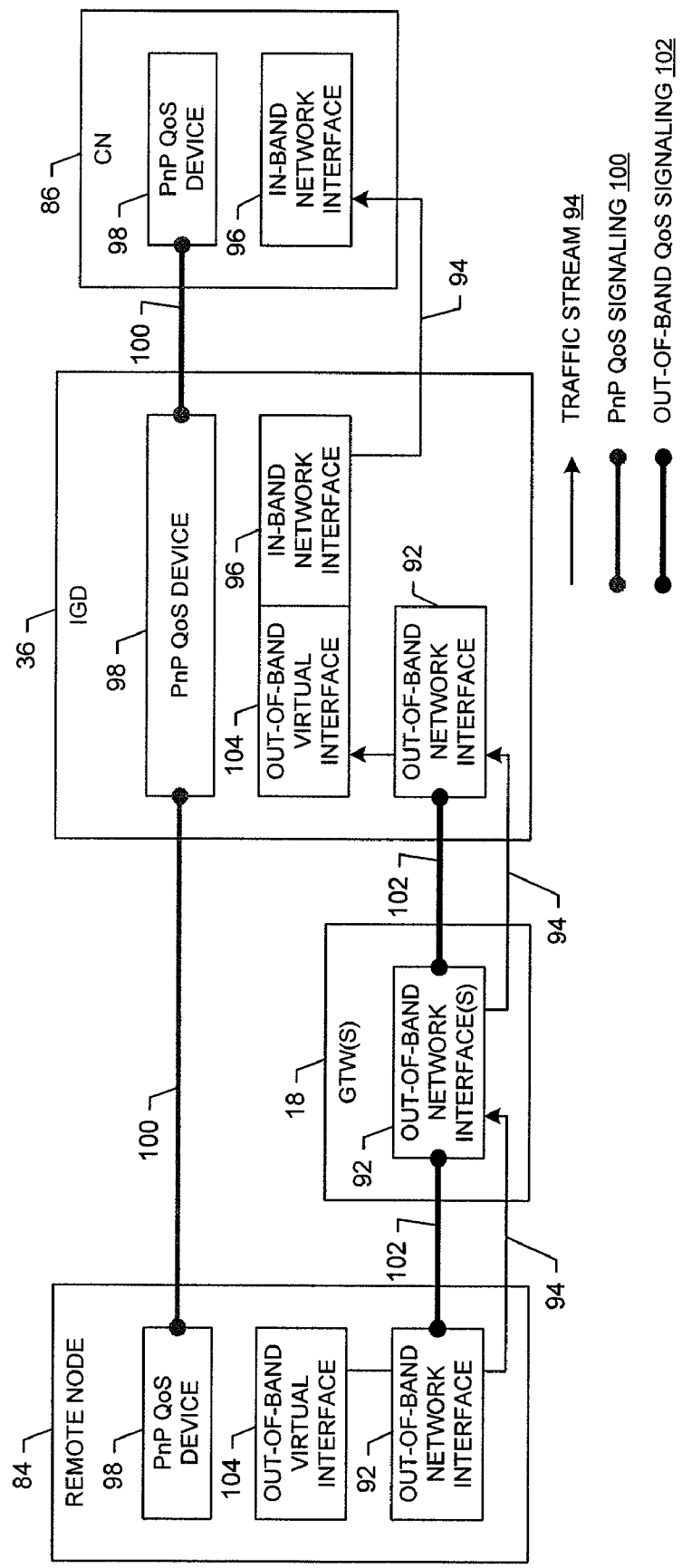
Figure 6:
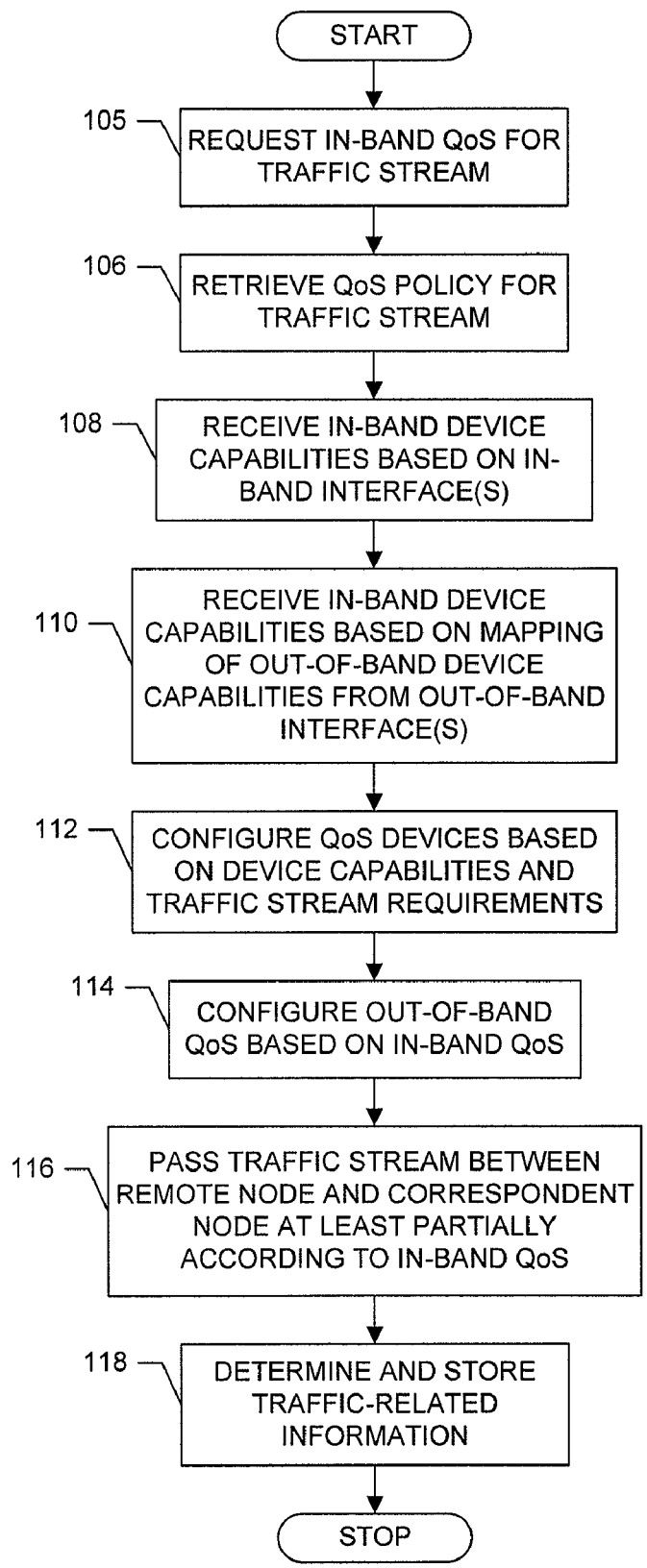

Having thus described the invention in general terms, reference will now be made to the accompanying drawings, which are not necessarily drawn to scale, and wherein:

FIG. 1 is a schematic block diagram of a wireless communications system according to one embodiment of the present invention including a mobile network and a data network to which a terminal is bi-directionally coupled through wireless RF links;

FIG. 2 is a schematic block diagram of an entity capable of operating as a terminal, gateway (GTW), origin server, wireless transceiver (TS), user processor and/or Internet gateway device (IGD), in accordance with exemplary embodiments of the present invention;

FIG. 3 is a schematic block diagram more particularly illustrating a terminal according to one exemplary embodiment of the present invention;

FIG. 4 is a schematic block diagram of various network entities of the system of FIG. 1 configured in an architecture in accordance with exemplary embodiments of the present invention;

FIG. 5 is a functional block diagram and a flowchart of a remote node communicating with a correspondent node within an Intranet via an IGD of an Intranet, in accordance with exemplary embodiments of the present invention; and FIG. 6 is a flowchart is shown that includes various steps in a method of providing QoS during remote access to a PnP network, in accordance with one exemplary embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, a terminal 10 may include an antenna 12 for transmitting signals to and for receiving signals from a base site or base station (BS) 14. The base station is a part of one or more cellular or mobile networks that each includes elements required to operate the network, such as a mobile switching center (MSC) 16. The mobile network may also be referred to as a Base Station/MSC/Interworking function (BMI). In operation, the MSC is capable of routing calls to and from the terminal when the terminal is making and receiving calls. The MSC can also provide a connection to landline trunks such as, for example, when the terminal is involved in a call. In addition, the MSC can be capable of controlling the forwarding of messages to and from the terminal, and can also controlling the forwarding of messages for the terminal to and from a messaging center, such as short messaging service (SMS) messages to and from a SMS center (SMSC) (not shown).

The MSC 16 can be coupled to one or more data networks, such as a local area network (LAN), a metropolitan area network (MAN), and/or a wide area network (WAN). The MSC can be directly coupled to the data network(s). In one typical embodiment, however, the MSC is coupled to one or more gateways (GTWs) 18, and the GTW(s) are coupled to one or more networks. As shown, the MSC is coupled to a WAN, such as the Internet 20, although it should be understood that one or more other networks (e.g., LANs, MANs, etc.) may be coupled between the MSC and the Internet via one or more GTWs. By coupling the MSC to networks including the Internet, devices such as processing elements (e.g., personal computers, server computers or the like) can be coupled to the terminal 10 via the Internet. For example, the processing elements can include one or more processing elements associated with one or more origin servers 22, one of which being shown in FIG. 1.

The BS 14 can also be coupled to a signaling GPRS (General Packet Radio Service) support node (SGSN) 24. The SGSN is typically capable of performing functions similar to the MSC 16 for packet-switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 26. The packet-switched core network is then coupled to another GTW, such as a GTW GPRS support node (GGSN) 28 (note that a GGSN may at times herein be referred to as a GTW 18), and the GGSN is coupled to the Internet. Also, the GGSN can be coupled to a messaging center, such as a multimedia messaging service (MMS) center (not shown). In this regard, the GGSN and the SGSN, like the MSC, can be capable of controlling the forwarding of messages, such as MMS messages. The GGSN and SGSN can also be capable of controlling the forwarding of messages for the terminal to and from the messaging center. In addition, by coupling the SGSN 24 to the GPRS core network 26 and the GGSN 28, processing elements such as origin server(s) 22 can be coupled to the terminal 10 via the Internet 20, SGSN and GGSN. In this regard, devices such as origin server(s) can communicate with the terminal across the SGSN, GPRS and GGSN.

Although not every element of every possible mobile network is shown and described herein, it should be appreciated that the terminal 10 can be coupled to one or more of any of a number of different networks through the BS 14. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode terminals (e.g., digital/analog or TDMA/CDMA/analog phones).

The terminal 10 can further be coupled to one or more wireless transceivers (TSs) 30. The TSs can comprise access points configured to communicate with the terminal in accordance with techniques such as, for example, radio frequency (RF), Bluetooth (BT), infrared (IrDA) or any of a number of different wireless networking techniques, including WLAN techniques as shown in FIG. 1. Additionally, or alternatively, the terminal can be coupled to one or more user processors 32. Each user processor can comprise a computing system such as a personal computer, laptop computer or the like. In this regard, the user processors can be configured to communicate with the terminal in accordance with techniques such as, for example, RF, BT, IrDA or any of a number of different wireline or wireless communication techniques, including LAN and/or WLAN techniques. One or more of the user processors can additionally, or alternatively, include a removable memory capable of storing content, which can thereafter be transferred to the terminal.

The TSs 30 and the user processors 32 may be coupled to the Internet 20. Like with the MSC 16, the TSs and user processors can be directly coupled to the Internet. In one embodiment, however, the TSs are indirectly coupled to the Internet via a GTW 18. As will be appreciated, by directly or indirectly connecting the terminals 10 and the origin server(s) 22, as well as any of a number of other devices, processors or the like, to the Internet, the terminals can communicate with one another, the origin server(s), etc., to thereby carry out various functions of the terminal, such as to transmit data, content or the like to, and/or receive content, data or the like from, the service providers and/or authorization managers.

In accordance with embodiments of the present invention, the Internet 20, and thus the terminal 10, can be coupled to one or more Intranets 34, one of which is illustrated in FIG. 1.

Each Intranet generally comprises a private network, such as in accordance with the UPnP™ (Universal Plug and Play) architecture. Thus, such an Intranet may at times be referred to as a plug-and-play network. Each Intranet can comprise one or more interlinked LANs, as well as portions of one or more LANs, MANs, WANs or the like. As with the Internet, devices such as terminals, processing elements (e.g., origin server(s) 22, user processor(s) 32, etc.) can be coupled to the Intranet, and thus the Internet and terminal, via the Intranet. Within the Intranet, the entities can be configured to communicate with one another in a number of different manners, such as in accordance with the UPnP™ architecture. Like various other components of the system, the Intranet, and thus the processing elements of the Intranet, is typically indirectly coupled to the Internet, and thus the terminal, via one or more gateways (and/or TSs 30), one or more of which may be referred to as Internet Gateway Devices (IGDs), one of which (i.e., IGD 36) is shown in FIG. 1. Similarly, although not shown, each network or portion of a network included within the Intranet can be interconnected with one another via a gateway. As explained below, a terminal is capable of accessing the Intranet, and thus processing elements (e.g., origin server(s), user processor(s), etc.) coupled to the Intranet, by establishing a Virtual Private Network (VPN) or other secure tunnel (e.g., IPSec, SSL/TLS, etc.) across the gateway to the Intranet, and if so required, across one or more other gateways within the Intranet. In such instances, then, the IGD coupling the Intranet and Internet may be referred to as a VPN GTW.

As shown and described above, a terminal 10 is capable of accessing the Internet 20, and thus the IGD 36 and Intranet 34, in any of a number of different manners. For example, a terminal can be capable of accessing the Internet via a TS 30 and/or user processor 32. Additionally or alternatively, a terminal can be capable of accessing the Internet via the MSC 16, such as to provide circuit-switched connectivity. Further, the terminal can additionally or alternatively be capable of accessing the Internet via the SGSN 24, such as to provide circuit or packet-switched connectivity across the GPRS core network 26. As used herein, such IAPs are referred to as "Internet Access Points" or IAPs. Although a terminal can access the Internet via any one or more of the aforementioned IAPs, it should be understood that the above IAPs are merely illustrative of the number of different IAPs by which the terminal can be capable of accessing the Internet.

Referring now to FIG. 2, a block diagram of an entity capable of operating as a terminal 10, GTW 18, origin server 22, TS 30, user processor 32 and/or IGD 36 is shown in accordance with one embodiment of the present invention. Although shown as separate entities, in some embodiments, one or more entities may support one or more of a terminal, GTW, origin server, TS, user processor and/or IGD, logically separated but co-located within the entit(ies). For example, a single entity may support a logically separate, but co-located, terminal and IGD.

The entity capable of operating as a terminal 10, GTW 18, origin server 22, TS 30, user processor 32 and/or IGD 36 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 2, the entity can include means, such as a processor 40 connected to a memory 42. The memory can comprise volatile and/or non-volatile memory, and typically stores content, data or the like. For example, the memory typically stores content transmitted from, and/or received by, the entity. Also for example, the memory typically stores client applications, instructions or the like for the processor to perform steps associated with operation of the entity in accordance with embodiments of the present invention. As explained below, for example, the memory can store client application(s) for implementing functional components of the respective entities.

As described herein, the client application(s) may each comprise software operated by the respective entities. It should be understood, however, that any one or more of the client applications described herein can alternatively comprise firmware or hardware, without departing from the spirit and scope of the present invention. Generally, then, the terminal 10, GTW 18, origin server 22, TS 30, user processor 32 and/or IGD 36 can include one or more logic elements for performing various functions of one or more client application(s). As will be appreciated, the logic elements can be embodied in any of a number of different manners. In this regard, the logic elements performing the functions of one or more client applications can be embodied in an integrated circuit assembly including one or more integrated circuits integral or otherwise in communication with a respective network entity (i.e., terminal, GTW, origin server, TS, user processor, IGD, etc.) or more particularly, for example, a processor 40 of the respective network entity. The design of integrated circuits is by and large a highly automated process. In this regard, complex and powerful software tools are available for converting a logic level design into a semiconductor circuit design ready to be etched and formed on a semiconductor substrate. These software tools automatically route conductors and locate components on a semiconductor chip using well established rules of design as well as huge libraries of pre-stored design modules. Once the design for a semiconductor circuit has been completed, the resultant design, in a standardized electronic format, may be transmitted to a semiconductor fabrication facility or "fab" for fabrication.

In addition to the memory 42, the processor 40 can also be connected to at least one interface or other means for displaying, transmitting and/or receiving data, content or the like. In this regard, the interface(s) can include at least one communication interface 44 or other means for transmitting and/or receiving data, content or the like. As explained below, for example, the communication interface(s) can include a first communication interface for connecting to a first network, and a second communication interface for connecting to a second network. In addition to the communication interface (s), the interface(s) can also include at least one user interface that can include a display 46 and/or a user input interface 48. The user input interface, in turn, can comprise any of a number of devices allowing the entity to receive data from a user, such as a keypad, a touch display, a joystick or other input device.

Reference is now made to FIG. 3, which more particularly illustrates one type of terminal 10 that would benefit from exemplary embodiments of the present invention. It should be understood, however, that the terminal illustrated and hereinafter described is merely illustrative of one type of terminal that would benefit from the present invention and, therefore, should not be taken to limit the scope of the present invention. While several exemplary embodiments of the terminal are illustrated and will be hereinafter described for purposes of example, other types of terminals, such as portable digital assistants (PDAs), pagers, laptop computers and other types of electronic systems, can readily employ exemplary embodiments of the present invention.

The terminal 10 includes various means for performing one or more functions in accordance with exemplary embodiments of the present invention, including those more particularly shown and described herein. It should be understood, however, that the terminal may include alternative means for performing one or more like functions, without departing from the spirit and scope of the present invention. More particularly, for example, as shown in FIG. 3, in addition to an antenna 12, the terminal can include a transmitter 50, receiver 52, and means, such as a controller 54 or other processor, that provides signals to and receives signals from the transmitter and receiver, respectively. These signals include signaling information in accordance with the air interface standard of the applicable cellular system, and also user speech and/or user generated data. In this regard, the terminal can be capable of operating with one or more air interface standards, communication protocols, modulation types, and access types. More particularly, the terminal can be capable of operating in accordance with any of a number of second generation (2G), 2.5G and/or third-generation (3G) communication protocols or the like. For example, the terminal may be capable of operating in accordance with 2G wireless communication protocols IS-136 (TDMA), GSM and IS-95 (CDMA), 2.5G wireless communication protocols such as GPRS and/or Enhanced Data GSM Environment (EDGE), and/or 3G wireless communication protocols such as cdma2000, Universal Mobile Telephone System (UMTS) network employing Wideband Code Division Multiple Access (WCDMA) radio access technology. Also, for example, the terminal can also be capable of operating in accordance with enhanced 3G wireless communication protocols such as 1XEV-DO (TIA/EIA/IS-856) and 1XEV-DV.

It is understood that the controller 54 includes the circuitry required for implementing the audio and logic functions of the terminal 10. For example, the controller may be comprised of a digital signal processor device, a microprocessor device, and various analog-to-digital converters, digital-to-analog converters, and other support circuits. The control and signal processing functions of the terminal are allocated between these devices according to their respective capabilities. The controller can additionally include an internal voice coder (VC), and may include an internal data modem (DM). Further, the controller may include the functionality to operate one or more software programs, which may be stored in memory. For example, the controller may be capable of operating a connectivity program, such as a conventional Web browser. The connectivity program may then allow the terminal to transmit and receive Web content, such as according to HTTP and/or the Wireless Application Protocol (WAP), for example.

The terminal 10 also comprises a user interface including a conventional earphone or speaker 56, a ringer 58, a microphone 60, a display 62, and a user input interface, all of which are coupled to the controller 54. The user input interface, which allows the terminal to receive data, can comprise any of a number of devices allowing the terminal to receive data, such as a keypad 64, a touch display (not shown) or other input device. In embodiments including a keypad, the keypad includes the conventional numeric (0-9) and related keys (#, *), and other keys used for operating the terminal. Although not shown, the terminal can include a battery, such as a vibrating battery pack, for powering the various circuits that are required to operate the terminal, as well as optionally providing mechanical vibration as a detectable output.

The terminal 10 can also include one or more means for sharing and/or obtaining data. For example, the terminal can include a short-range radio frequency (RF) interface 66 so that data can be shared with and/or obtained from electronic devices in accordance with RF techniques. In this regard, the RF interface may function as a WLAN and/or WAN interface capable of sharing data with other radio frequency interfaces in accordance with WLAN and/or WAN techniques. More particularly, for example, the RF interface may function as a WLAN interface, or the terminal may include a separate WLAN interface 68, capable of sharing data in accordance with WLAN techniques such as IEEE 802.11, WiMAX techniques such as IEEE 802.16 or the like. Similarly, for example, the terminal can include a separate LAN interface 70 capable of sharing data in accordance with LAN techniques. The terminal can additionally or alternatively include other wireline and/or wireless interfaces. For example, the terminal can include a universal serial bus (USB) interface 72, and/or short-range wireless interfaces, such as an infrared (IR) interface 74, and/or a Bluetooth (BT) interface 76 operating using Bluetooth brand wireless technology developed by the Bluetooth Special Interest Group. The terminal can therefore additionally or alternatively be capable of transmitting data to and/or receiving data from electronic devices in accordance with such techniques.

The terminal 10 can further include memory, such as a subscriber identity module (SIM) 78, a removable user identity module (R-UIM) or the like, which typically stores information elements related to a mobile subscriber. In addition to the SIM, the terminal can include other removable and/or fixed memory. In this regard, the terminal can include volatile memory 80, such as volatile Random Access Memory (RAM) including a cache area for the temporary storage of data. The terminal can also include other non-volatile memory 82, which can be embedded and/or may be removable. The non-volatile memory can additionally or alternatively comprise an EEPROM, flash memory or the like. The memories can store any of a number of software applications, instructions, pieces of information, and data, used by the terminal to implement the functions of the terminal. For example, the memories can store an identifier, such as an international mobile equipment identification (IMEI) code, international mobile subscriber identification (IMSI) code, mobile station integrated services digital network (MSISDN) code (mobile telephone number), Internet Protocol (IP) address, Session Initiation Protocol (SIP) address or the like, capable of uniquely identifying the terminal.

As will be appreciated, a number of the entities of the system of FIG. 1 can be configured in any of a number of different architectures to perform any of a number of functions, such as to effectuate remote access to an Intranet 34 configured in accordance with a plug-and-play (e.g., UPnP™) architecture. Exemplary embodiments of the present invention may be described herein with respect to the UPnP™ architecture. It should be understood, however, that exemplary embodiments of the present invention may be equally applicable to other plug-and-play architectures. Reference is now briefly made to FIG. 4, which illustrates various entities of an architecture in accordance with exemplary embodiments of the present invention, although it should again be understood that although not every element of the architecture is shown and described herein with reference thereto. As shown, one or more terminals 10, origin servers 22 and/or user processors 32 may operate as plug-and-play-enabled (PnP-enabled) remote nodes 84 in communication with one or more other terminals, origin servers and/or user processors operating as PnP-enabled correspondent nodes 86 within an Intranet. In this regard, the remote node may be operatively coupled to one or more access networks 88 (e.g., LANs, MANs, WANs, 1G, 2G, 2.5G and/or 3G mobile communication networks, etc.) via respective GTWs 18. Similarly, the correspondent node may be operatively coupled to an Intranet via a PnP-enabled IGD 36. To enable communication between the remote node and the correspondent node, then, the access network and the Intranet may be operatively coupled to one another across the Internet 20 via one or more further GTWs.

As also shown, the remote node 84 is in communication with the correspondent node 86 across a VPN or other secure tunnel 90 (e.g., IPSec, SSL/TLS, etc.) between the remote node and IGD 36 of the Intranet 34. As explained in the background, conventional quality of service (QoS) within a PnP architecture such as that provided by UPnP™ may fail to work via a VPN or other secure tunnel as the QoS signaling may be buried in the secure tunnel and not visible to the network elements necessary to establish that QoS. More particularly, as currently provided by architectures such as UPnP™, remote nodes may effectuate QoS out-of-band of the Intranet up to the IGD by exchanging out-of-band QoS signaling between the remote node and the IGD, and the GTWs therebetween. For example, the remote node may effectuate WAN QoS up to the IGD by exchanging WAN QoS signaling with the IGD and the GTWs 18 therebetween. Similarly, the correspondent node 86 within the Intranet may effectuate an in-band, PnP QoS with the IGD by exchanging PnP QoS signaling with the IGD. To provide a complete end-to-end solution, then, the IGD may include or otherwise be in communication with a QoS bridge configured to map between the out-of-band QoS and the in-band QoS. Even in such an instance, however, the neither the remote node nor the route between the remote node and the IGD are exposed to the in-band QoS.

Reference is now drawn to FIGS. 5 and 6, which illustrate a functional block diagram and a flowchart of a remote node 84 communicating with a correspondent node 86 within an Intranet via an IGD 36 of the Intranet, in accordance with exemplary embodiments of the present invention. As shown, the remote node communicates with the IGD at least partially across a VPN or other secure tunnel established over one or more GTW(s) 18 between the remote node and the IGD. In this regard, to communicate across an access network 88 and the Internet 20 (out of band with the Intranet 34), the remote node, GTW(s) and IGD each operate or otherwise include a first, out-of-band (e.g., WAN) network interface 92 from and/or to which a traffic stream 94 may pass between the remote node, GTW(s) and IGD. Similarly, to communicate across the Intranet, the IGD and the correspondent node each operate or otherwise include a second, in-band (e.g., LAN) network interface 96 from and/or to which a traffic stream may pass between the IGD and correspondent node.

To effectuate a PnP QoS service, the PnP-enabled remote node 84, IGD 36 and correspondent node 86 each operate or otherwise include a PnP QoS device 98 from and/or to which PnP QoS signaling 100 may pass between the remote node, IGD and correspondent node. As shown and described herein, the PnP QoS device of the IGD may also function as a QoS manager and QoS policy holder, as explained below. It should be understood, however, that one or both of a QoS manager and QoS policy holder may alternatively be located remote from and in communication with the IGD, such as across the Intranet 34.

Similar to in-band QoS service, to effectuate a QoS service out-of-band with the Intranet 34 (i.e., out-of-band QoS service), the remote node 84, GTW(s) 18 and IGD 36 each operate or otherwise include an out-of-band QoS device, which may be integrated with or distributed from the out-of-band network interfaces 92 of at least the remote node and IGD. As shown and described herein, the out-of-band QoS device is integrated with the out-of-band network interfaces, and as such, references to the out-of-band network interfaces may refer to functions of the out-of-band network interfaces themselves and/or the out-of-band QoS devices integrated therewith. Similar to the PnP QoS device 98, then, out-of-band QoS signaling 102 may pass between the remote node, GTW(s) and IGD from and/or to the out-of-band network interfaces.

In accordance with exemplary embodiments of the present invention, the remote node 84 and the IGD 36 further include an out-of-band virtual interface 104 adapted to mirror out-of-band QoS parameters into in-band, PnP QoS parameters (e.g., device capabilities, traffic-related information, etc.), and at least partially configure the out-of-band QoS service based upon the in-band QoS service configuration. More particularly with respect to UPnP™, for example, the virtual interfaces may mirror one or more WAN QoS parameters into UPnP™ QoSDeviceCapabilites, and take the appropriate action at the WAN QoS level when a UPnP™-enabled device attempts to configure the UPnP™ QoS service for remote access via a SetupTrafficQoS action. The virtual interfaces of exemplary embodiments of the present invention enable the remote node and correspondent node 86 to provide an in-band, PnP QoS service at least partially out-of-band and in a manner transparent to any out-of-band QoS service, although the out-of-band QoS may be enforced by an out-of-band QoS service. In this regard, the usage out-of-band QoS details may not be exposed to the PnP QoS devices 98, which may interact only with the in-band PnP QoS, and may use only PnP QoS parameters. At the in-band, PnP level, then, the path between the remote node and the IGD may be exposed as one (logical) hop, and may be indicated as a tunnel or encapsulated interface.

As shown and described herein, the PnP QoS devices 98, first and second network interfaces 92, 96 and virtual interfaces 104 may comprise software applications stored in memory of the respective entities, capable of functioning as clients in a client-server arrangement. It should be understood, however, that one or more of the PnP QoS devices, first and second network interfaces and virtual interfaces can alternatively comprise firmware or hardware. In addition, it should also be understood that one or more of the PnP QoS devices, first and second network interfaces and virtual interfaces can additionally or alternatively be operated from a network entity other than the entity shown and principally described herein as operating the respective applications.

Further, although shown and described as separate entities, one or more functions of the remote node 84, GTW(s) 18, IGD 36 and/or correspondent node 86 may be performed by one or more of the other of the remote node, GTW(s), IGD and/or correspondent node. Thus, for example, although a function may be described as being performed by the IGD, that function may equally be performed by a GTW or correspondent node. Similarly, one or more functions of the PnP device, virtual interface and/or first network interface may be performed by one or more of the other of the PnP device, virtual interface and/or first network interface.

Referring now to FIG. 6, a method of providing QoS during remote access to a PnP network may include a control point (not shown) requesting in-band QoS, such as by requesting a QoS manager and passing, to the QoS manager, information (e.g., traffic descriptor) for setting up QoS including, as shown in block 105. Such information may include, for example, a traffic stream 94 (e.g., traffic ID), source (e.g., remote node 84), destination or sink (e.g., correspondent node 86) and any intermediate nodes (e.g., IGD 36). In addition, if so desired, the control point may identify a QoS policy holder for setting up QoS for a traffic stream 94. Again, as shown, both QoS manager and policy holder are integrated with the QoS device 98 of the IGD. It should be understood, however, that the QoS manager and/or policy holder may be remote from the IGD and in communication therewith to carry out their respective functions as described herein.

After receiving a request for Qos from a control point, the QoS manager communicates with the QoS policy holder to retrieve, from the QoS policy holder, an appropriate policy for a traffic stream (e.g., traffic descriptor) identified by the control point, as shown in block 106. If the control point does not identify a policy holder or a particular policy holder is non-existent or otherwise unavailable, however, the QoS manager may operate based on a default policy (e.g., best effort). In addition to identifying a policy, the QoS manager may determine or otherwise identify the QoS devices 98 of the remote node 84, correspondent node 86 and any intermediate nodes (e.g., IGD 36) based on the source and destination information for the traffic stream identified by the control point.

The policy provided by the QoS policy holder may include any of a number of different pieces of information including, for example, a traffic importance number, user importance number, admission policy and the like. In this regard, the traffic importance number may be utilized by the QoS manager to determine a packet priority value for the traffic stream 94. The user importance number provides a relative rating of the traffic stream's importance to other traffic streams, and may be utilized by the QoS manager to determine or otherwise identify one or more permitted traffic streams during instances of insufficient network resources. The admission policy may be utilized by the QoS manager to determine if end-to-end admission control is enabled in the home network (Intranet 34).

After receiving the policy from the QoS policy holder, the QoS manager may then configure the QoS devices 98 of the remote node 84, IGD 36 and correspondent node 86 (via QoS signaling 100) for handling the identified traffic stream, where the QoS devices may be configured based on the retrieved policy. The QoS device's setup may depend on the capabilities of the device and include setting of packet handling priorities, QoS-based admission control and/or other setup functions. Thus, before configuring the QoS devices, the QoS manager may determine the network capabilities of the remote node, correspondent node and any intermediate nodes (e.g., IGD), such as by initiating an appropriate action (e.g., GetQosDeviceCapabilities) on each respective node. The network capabilities of each node may include, for example, an indication of the network technology type being implemented by the respective node (e.g., 802.11, 802.3, etc.), an indication of whether the interface(s) of the respective node is capable of performing node-level admission control, an indication of a native type of QoS (e.g., prioritized, best efforts, etc.) supported by the interface(s), a maximum communication or data rate at the physical layer of the interface(s), the channel on which the network interface is operating (for wireless communication), and the like.

The QoS manager may receive in-band device capabilities for the PnP QoS devices 98 of the IGD 36 and correspondent node 86 at least partially based on their respective in-band network interfaces 96, the respective QoS being an in-band, PnP QoS, as shown in block 108. For passing a traffic stream 94 between the remote node and the IGD, however, the remote node, IGD and any GTW(s) 18 therebetween include out-of-band network interfaces 92. Thus, to provide in-band QoS for a traffic stream between those nodes, the remote node and IGD include out-of-band virtual interfaces 104 adapted to mirror out-of-band device capabilities into in-band device capabilities, which may then be provided to the QoS manager, as shown in block 110. Thus, for example, one or more of the indications of network technology type, node-level admission control, native type of QoS, maximum communication or data rate, and/or channel may be mapped from out-of-band QoS parameters supplied by the out-of-band network interfaces of the remote node and IGD, to in-band QoS parameters included in the device capabilities of the QoS devices of the remote node and IGD. The device capabilities of the QoS devices of the remote node and IGD, insofar as those nodes pass a traffic stream across out-of-band network interfaces, may then be provided as though their respective interfaces are in-band.

After determining the device capabilities of the remote node 84, correspondent node 86 and any intermediate nodes (e.g., IGD 36), the QoS manager may configure the QoS devices 98 for a desired QoS based on the respective device capabilities, as well as the policy for the traffic stream, as shown in block 112. The QoS manager may configure the QoS devices in accordance with any of a number of strategies. In this regard, the QoS manager may configure the respective QoS devices with the information provided by the control point to the QoS manager for setting up QoS (e.g., traffic descriptor), as well as information from the policy provided by the QoS policy holder (e.g., traffic importance number, user importance number, admission policy, etc.). For example, the QoS manager may configure the respective QoS devices with the traffic importance number for setting up QoS in accordance with a packet priority strategy. In such instances, the source node (e.g., remote node) may implement the configured QoS by prioritizing the traffic stream 94 according with the traffic importance number on its output interface. As indicated above, however, the output interface of the remote node (as well as the input interface of the IGD for incoming traffic) is an out-of-band network interface 92 adapted to implement an out-of-band QoS. Thus, the out-of-band virtual interface 104 may be further adapted to configure the remote node to implement the out-of-band QoS based on the in-band QoS, as shown in block 114. More particularly, for example, the out-of-band virtual interface may configure the out-of-band network interface of the remote node to implement its out-of-band QoS (via QoS signaling 102) according to the in-band QoS, or more particularly the respective in-band QoS strategy.

After configuring the respective nodes for in-band QoS, a respective traffic stream 94 may be passed therebetween at least partially according to the in-band QoS, including across a VPN or other secure tunnel 90 between the remote node and IGD, as shown in block 116. That is, the remote node 84 may communicate with the IGD 36 via the first, out-of-band (e.g., WAN) network interfaces 92 from and/or to which the traffic stream may pass, in accordance with an out-of-band QoS configured at least partially based on the in-band QoS. Similarly, the IGD may communicate with the correspondent node 86 via the second second, in-band (e.g., LAN) network interfaces 96 from and/or to which the traffic stream may pass, in accordance with the in-band QoS. As the traffic stream is passed between the nodes, the QoS devices 98 of the remote node, correspondent node and any intermediate nodes (e.g., IGD) may determine and store information related to the traffic stream at their respective interfaces such that the QoS manager may monitor the state of the traffic stream, as shown in block 118. In this regard, for in-band QoS, the in-band network interfaces 96 of the IGD 36 and correspondent node 86 may directly report traffic-related information to respective QoS devices 98. For out-of-band QoS, on the other hand, the out-of-band network interfaces 92 of the remote node 84 and IGD may report traffic-related information to respective out-of-band virtual interfaces 104. In turn, the out-of-band virtual interfaces may report the traffic-related information to respective QoS devices of the remote node and IGD. The out-of-band virtual interfaces may therefore be adapted to mirror the out-of-band traffic-related information into in-band traffic information before passing the traffic-related information to the QoS devices.

According to one exemplary aspect of the present invention, the functions performed by one or more of the entities of the system, such as the terminal 10, GTW 18, origin server 22, TS 30, user processor 32 and/or IGD 36, may be performed by various means, such as hardware and/or firmware, including those described above, alone and/or under control of a computer program product. The computer program product for performing one or more functions of exemplary embodiments of the present invention includes a computer-readable storage medium, such as the non-volatile storage medium, and software including computer-readable program code portions, such as a series of computer instructions, embodied in the computer-readable storage medium.

In this regard, FIG. 6 is a flowchart of methods, systems and/or computer program products according to exemplary embodiments of the present the invention. It will be understood that each block or step of the flowchart, and combinations of blocks in the flowchart, can be implemented by various means, such as hardware, firmware, and/or software including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block (s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart supports combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
a processor configured to retrieve a quality of service policy for a traffic stream in accordance with a plug-and-play quality of service,
wherein the processor is configured to receive in-band device capabilities of a plug-and-play-enabled correspondent node configured to operate in-band with respect to a plug-and-play network, the in-band device capabilities of the correspondent node being at least partially based on an in-band network interface of the correspondent node,
wherein the processor is configured to receive in-band device capabilities of a plug-and-play-enabled remote node configured to operate out-of-band with respect to the plug-and-play network and in communication with the plug-and-play network over a secure tunnel, the in-band device capabilities having been mapped from out-of-band device capabilities, the out-of-band device capabilities being at least partially based on an out-of-band network interface of the remote node, and
wherein the processor is configured to configure the correspondent and remote nodes for a desired in-band quality of service based on the quality of service policy and respective device capabilities, such that the correspondent and remote nodes are thereafter configured to pass a traffic stream therebetween in accordance with the desired in-band QoS, the traffic stream being passed at least partially over the secure tunnel.

2. An apparatus according to claim 1, wherein the processor is configured to receive the in-band device capabilities of the correspondent and remote nodes in accordance with the plug and play quality of service.

3. An apparatus according to claim 1, wherein the processor is configured to configure the remote node such that the remote node implements an out-of-band quality of service over the secure tunnel based on the in-band quality of service.

4. An apparatus according to claim 1, wherein the processor is further configured to monitor a state of the traffic stream being passed between the remote and correspondent nodes, the state of the traffic stream being monitored based on in-band traffic-related information determined by the remote and correspondent nodes, the in-band traffic-related information determined by the remote node having been mapped from out-of-band traffic-related information, the out-of-band traffic-related information being at least partially reported by the out-of-band network interface of the remote node.

5. An apparatus comprising:
a plurality of components configured to operate out-of-band with respect to a plug-and-play network, the plug-and-play network including a plug-and-play-enabled correspondent node configured to operate in-band with respect to the plug-and-play network, the plurality of components comprising:
an out-of-band network interface configured to initiate communication with the plug-and-play network over a secure tunnel;
an out-of-band virtual interface configured to map out-of-band device capabilities into in-band device capabilities, the out-of-band device capabilities being at least partially based on the out-of-band network interface;
a plug-and-play device configured to send the in-band device capabilities to a quality of service manager of the plug-and-play network, the quality of service manager being configured to retrieve a quality of service policy for a traffic stream in accordance with a plug-and-play quality of service, configured to receive in-band device capabilities of the correspondent node, and configured to configure the correspondent and remote nodes for a desired in-band quality of service based on the quality of service policy and respective device capabilities, and
wherein the out-of-band network interface is configured to pass a traffic stream to the correspondent node in accordance with the desired in-band quality of service, the traffic stream being passed at least partially over the secure tunnel.

6. An apparatus according to claim 5, wherein the plug-and-play device is configured to send the in-band device capabilities in accordance with the plug-and-play quality of service.

7. An apparatus according to claim 5, wherein the out-of-band network interface is configured to pass the traffic stream including implementing an out-of-band quality of service over the secure tunnel based on the in-band quality of service.

8. An apparatus according to claim 5, wherein the out-of-band network interface is configured to report out-of-band traffic-related information,
wherein the out-of-band virtual interface is configured to map the out-of-band traffic-related information into in-band traffic-related information to thereby determine in-band traffic-related information.

9. A method comprising:
retrieving a quality of service policy for a traffic stream in accordance with a plug-and-play quality of service;
receiving in-band device capabilities of a plug-and-play-enabled correspondent node configured to operate in-band with respect to a plug-and-play network, the in-band device capabilities of the correspondent node being at least partially based on an in-band network interface of the correspondent node;
receiving in-band device capabilities of a plug-and-play-enabled remote node configured to operate out-of-band with respect to the plug-and-play network and in communication with the plug-and-play network over a secure tunnel, the in-band device capabilities having been mapped from out-of-band device capabilities, the out-of-band device capabilities being at least partially based on an out-of-band network interface of the remote node; and
configuring the correspondent and remote nodes for a desired in-band quality of service based on the quality of service policy and respective device capabilities, the correspondent and remote nodes being configured such that the correspondent and remote nodes are thereafter configured to pass a traffic stream therebetween in accordance with the desired in-band quality of service, the traffic stream being passed at least partially over the secure tunnel.

10. A method according to claim 9, wherein the receiving steps comprise receiving in-band device capabilities in accordance with the plug-and-play quality of service.

11. A method according to claim 9, wherein configuring the remote node comprises configuring the remote node such that the remote node implements an out-of-band quality of service over the secure tunnel based on the in-band quality of service.

12. A method according to claim 9 further comprising:
monitoring a state of the traffic stream being passed between the remote and correspondent nodes, the state of the traffic stream being monitored based on in-band traffic-related information determined by the remote and correspondent nodes, the in-band traffic-related information determined by the remote node having been mapped from out-of-band traffic-related information, the out-of-band traffic-related information being at least partially reported by the out-of-band network interface of the remote node.

13. A method of providing quality of service during remote access to a plug-and-play network, the method comprising:
   initiating communication with a plug-and-play network over a secure tunnel, the communication being initiated by a plug-and-play-enabled remote node configured to operate out-of-band with respect to the plug-and-play network, the plug-and-play network including a plug-and-play-enabled correspondent node configured to operate in-band with respect to a plug-and-play network;
   mapping out-of-band device capabilities into in-band device capabilities at the remote node, the out-of-band device capabilities being at least partially based on an out-of-band network interface of the remote node;
   sending the in-band device capabilities of the remote node to a quality of service manager of the plug-and-play network, the quality of service manager also being configured to retrieve a quality of service policy for a traffic stream in accordance with a plug-and-play quality of service, configured to receive in-band device capabilities of the correspondent node, and configured to configure the correspondent and remote nodes for a desired in-band quality of service based on the quality of service policy and respective device capabilities; and
   passing a traffic stream between the remote and correspondent nodes in accordance with the desired in-band quality of service, the traffic stream being passed at least partially over the secure tunnel.

14. A method according to claim 13, wherein the sending step comprises sending in-band device capabilities in accordance with the plug-and-play quality of service.

15. A method according to claim 13, wherein passing the traffic stream includes implementing an out-of-band quality of service over the secure tunnel based on the in-band quality of service.

16. A method according to claim 13 further comprising:
   determining in-band traffic-related information, the determining step including mapping out-of-band traffic-related information into in-band traffic-related information, the out-of-band traffic-related information being at least partially reported by the out-of-band network interface of the remote node.

17. A computer-readable storage medium having computer-readable program code portions stored therein, the computer-readable program code portions comprising:
   a first executable portion configured to retrieve a quality of service policy for a traffic stream in accordance with a plug-and-play quality of service;
   a second executable portion configured to receive in-band device capabilities of a plug-and-play-enabled correspondent node configured to operate in-band with respect to a plug-and-play network, the in-band device capabilities of the correspondent node being at least partially based on an in-band network interface of the correspondent node;
   a third executable portion configured to receive in-band device capabilities of a plug-and-play-enabled remote node configured to operate out-of-band with respect to the plug-and-play network and in communication with the plug-and-play network over a secure tunnel, the in-band device capabilities having been mapped from out-of-band device capabilities, the out-of-band device capabilities being at least partially based on an out-of-band network interface of the remote node; and
   a fourth executable portion configured to configure the correspondent and remote nodes for a desired in-band quality of service based on the quality of service policy and respective device capabilities, the correspondent and remote nodes being configured such that the correspondent and remote nodes are thereafter configured to pass a traffic stream therebetween in accordance with the desired in-band quality of service, the traffic stream being passed at least partially over the secure tunnel.

18. A computer-readable storage medium according to claim 17, wherein the second and third executable portions are configured to receive the in-band device capabilities in accordance with the plug-and-play quality of service.

19. A computer-readable storage medium according to claim 17, wherein the fourth executable portion is configured to configure the remote node such that the remote node implements an out-of-band quality of service over the secure tunnel based on the in-band quality of service.

20. A computer-readable storage medium according to claim 17, the computer-readable program code portions further comprising:
   a fifth executable portion configured to monitor a state of the traffic stream being passed between the remote and correspondent nodes, the state of the traffic stream being monitored based on in-band traffic-related information determined by the remote and correspondent nodes, the in-band traffic-related information determined by the remote node having been mapped from out-of-band traffic-related information, the out-of-band traffic-related information being at least partially reported by the out-of-band network interface of the remote node.

21. A computer-readable storage medium having computer-readable program code portions stored therein, the computer-readable program code portions comprising:
   a first executable portion configured to initiate communication with a plug-and-play network over a secure tunnel, the communication being initiated by a plug-and-play-enabled remote node configured to operate out-of-band with respect to the plug-and-play network, the plug-and-play network including a plug-and-play-enabled correspondent node configured to operate in-band with respect to the plug-and-play network;
   a second executable portion configured to map out-of-band device capabilities into in-band device capabilities at the remote node, the out-of-band device capabilities being at least partially based on an out-of-band network interface of the remote node;
   a third executable portion configured to send the in-band device capabilities of the remote node to a quality of service manager of the plug-and-play network, the quality of service manager also being configured to retrieve a quality of service policy for a traffic stream in accordance with a plug-and-play quality of service, configured to receive in-band device capabilities of the correspondent node, and configured to configure the correspondent and remote nodes for a desired in-band quality of service based on the quality of service policy and respective device capabilities; and
   a fourth executable portion configured to pass a traffic stream between the remote and correspondent nodes in accordance with the desired in-band quality of service, the traffic stream being passed at least partially over the secure tunnel.

22. A computer-readable storage medium according to claim 21, wherein the third executable portion is configured to send in-band device capabilities in accordance with the plug-and-play quality of service.

23. A computer-readable storage medium according to claim 21, wherein the fourth executable portion is configured to pass the traffic stream including implementing an out-of-band quality of service over the secure tunnel based on the in-band quality of service.

24. A computer-readable storage medium according to claim 21, The computer-readable program code portions further comprising:
   a fifth executable portion configured to determine in-band traffic-related information, the fifth executable portion being configured to determine in-band traffic including, the out-of-band traffic-related information being at least partially reported by the out-of-band network interface of the remote node.

25. An apparatus comprising:
   a processor configured to receive in-band device capabilities of a remote node configured to operate out-of-band with respect to a plug-and-play network that includes a plug-and-play-enabled correspondent node configured to operate in-band with respect to the plug-and-play network, the remote node including an out-of-band network interface for initiating communication with the plug-and-play network over a secure tunnel, and an out-of-band virtual interface for mapping out-of-band device capabilities of the remote node into the in-band device capabilities, the out-of-band device capabilities being at least partially based on the out-of-band network interface,
   wherein the processor is configured to send the in-band device capabilities to a quality of service manager of the plug-and-play network to enable the quality of service manager to configure the correspondent and remote nodes for a desired in-band quality of service based on the in-band device capabilities of the remote node, and based on in-band device capabilities of the correspondent node and a quality of service policy.

26. An apparatus according to claim 25, wherein the processor is configured to send the in-band device capabilities to the quality of service manager in accordance with a plug-and-play quality of service.

27. A method comprising:
   receiving in-band device capabilities of a remote node configured to operate out-of-band with respect to a plug-and-play network that includes a plug-and-play-enabled correspondent node configured to operate in-band with respect to the plug-and-play network, the remote node including an out-of-band network interface for initiating communication with the plug-and-play network over a secure tunnel, and an out-of-band virtual interface for mapping out-of-band device capabilities of the remote node into the in-band device capabilities, the out-of-band device capabilities being at least partially based on the out-of-band network interface; and
   sending the in-band device capabilities to a quality of service manager of the plug-and-play network to enable the quality of service manager to configure the correspondent and remote nodes for a desired in-band quality of service based on the in-band device capabilities of the remote node, and based on in-band device capabilities of the correspondent node and a quality of service policy.

28. A method according to claim 27, wherein sending the in-band device capabilities comprises sending the in-band device capabilities to the quality of service manager in accordance with a plug-and-play quality of service.

29. A computer-readable storage medium having computer-readable program code portions stored therein, the computer-readable program code portions comprising:
   a first executable portion configured to receive in-band device capabilities of a remote node configured to operate out-of-band with respect to a plug-and-play network that includes a plug-and-play-enabled correspondent node configured to operate in-band with respect to the plug-and-play network, the remote node including an out-of-band network interface for initiating communication with the plug-and-play network over a secure tunnel, and an out-of-band virtual interface for mapping out-of-band device capabilities of the remote node into the in-band device capabilities, the out-of-band device capabilities being at least partially based on the out-of-band network interface; and
   a second executable portion configured to send the in-band device capabilities to a quality of service manager of the plug-and-play network to enable the quality of service manager to configure the correspondent and remote nodes for a desired in-band quality of service based on the in-band device capabilities of the remote node, and based on in-band device capabilities of the correspondent node and a quality of service policy.

30. An computer-readable storage medium according to claim 29, wherein the second executable portion is configured to send the in-band device capabilities to the quality of service manager in accordance with a plug-and-play quality of service.

* * * * *

UNITED STATES PATENT AND TRADEMARK OFFICE
CERTIFICATE OF CORRECTION

| | | |
|---|---|---|
| PATENT NO. | : 7,545,753 B2 | Page 1 of 1 |
| APPLICATION NO. | : 11/380764 | |
| DATED | : June 9, 2009 | |
| INVENTOR(S) | : Stirbu | |

It is certified that error appears in the above-identified patent and that said Letters Patent is hereby corrected as shown below:

Column 19,

Line 13, after "including" insert --mapping out-of-band traffic-related information into in-band traffic-related information--.

Signed and Sealed this

Twenty-second Day of December, 2009

David J. Kappos
*Director of the United States Patent and Trademark Office*